United States Patent [19]
Dombach

[11] Patent Number: 4,460,304
[45] Date of Patent: Jul. 17, 1984

[54] TILE ORIENTATION APPARATUS

[75] Inventor: Kevin R. Dombach, Millersville, Pa.

[73] Assignee: Armstrong World Industries, Inc., Lancaster, Pa.

[21] Appl. No.: 441,495

[22] Filed: Nov. 15, 1982

[51] Int. Cl.³ .............................................. B65G 57/08
[52] U.S. Cl. ........................................ 414/33; 53/544; 198/374; 414/52; 414/55; 414/758
[58] Field of Search .................... 414/28, 29, 32, 33, 414/46, 52, 55, 85, 758; 198/374; 53/544

[56] References Cited
U.S. PATENT DOCUMENTS 2,768,756 10/1956 Horman .......................... 414/85 X
2,814,397 11/1957 Connell ........................... 414/33 X
2,921,508 1/1960 Schneider et al. ............... 414/35 X
3,128,889 4/1964 Johnson et al. .................. 414/55 X Primary Examiner—Leslie J. Paperner

[57] ABSTRACT

Disclosed is an apparatus for removing the top tile from a stack thereof formed face down on a first conveyor at a first location and placing it on a device which flips the tile over onto a second conveyor adapted to travel at right angles to the first one. The flipped tile is held in place on the second conveyor while the stack of remaining tiles is moved to a second location and pushed off of the first conveyor onto the flipped tile. With the tile so oriented the backs of the tiles at each end of the stack will face outwardly.

4 Claims, 6 Drawing Figures

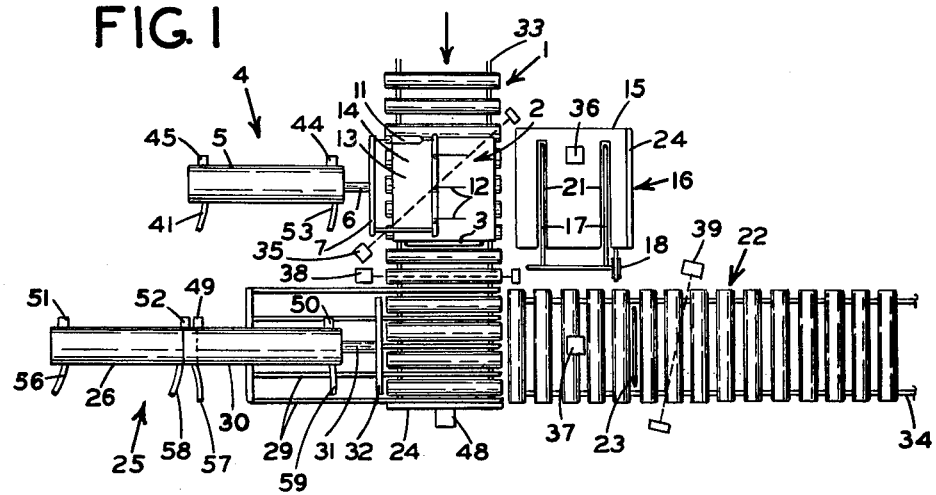
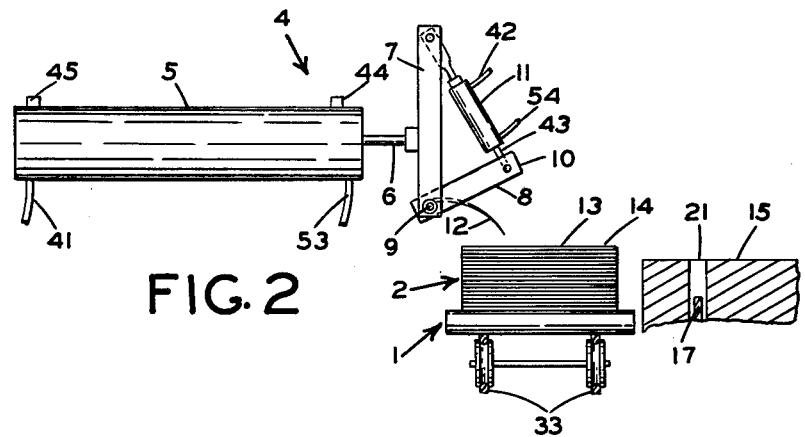
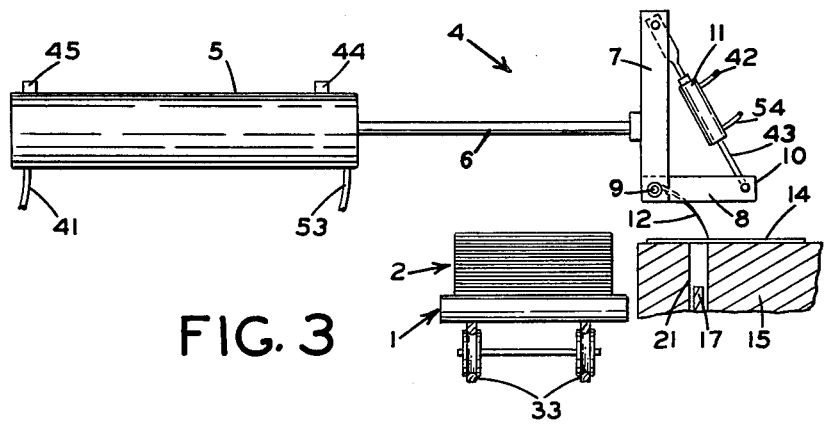

TILE ORIENTATION APPARATUS

BACKGROUND OF THE INVENTION

1. Field of the Invention

This invention relates generally to the orientation of resilient tiles or similar flat articles in a stack thereof and, more particularly, to an apparatus for orienting the tile in the stack in such a manner that, when packaged for shipment, the back of at least one tile at each end of the stack has its back surface adjacent the inner surface of the end of the shipping box or carton.

2. Description of the Prior Art

In the process of packaging resilient tiles for shipping, it is customary to form a stack thereof which is then placed in a corrugated box or carton. When the tiles are so packaged, it is desirable to have the backs of the first and last tiles of the stack adjacent the corrugated inner surface of the ends of the carton to avoid marring of the face of the tile by the corrugations. It is further desirable that the tiles be so oriented to avoid damage to the face of the end tiles because, as sometimes happens, the carton is opened with a knife, screwdriver, or some blunt instrument by a not-so-careful, over-anxious customer.

With the widespread practice of the home mechanic installing his own tile, it is conventional to apply pressure-sensitive adhesive to the backs of the tiles at the place of manufacture and cover the tile with a releasable paper which can be removed at the time of installation of the tile on a surface so that the tile can then be placed in the desired location and bonded to the surface by simply pressing it in place.

It is also conventional practice to form a stack of such tile prior to placing them in a carton for shipment. This is normally accomplished by conveying the tiles through a conventional automatic apparatus for accomplishing the above.

Since the adhesive is applied to the backs of the tiles, they issue from the adhesive-applying apparatus with the backs of all the tiles facing upwardly. It can be seen, therefore, that if a stack of the tiles were formed in which all of the tiles were facing the same direction as they were when they issued from the adhesive-applying apparatus, the face of the bottom tile would be adjacent the inner corrugated surface of a shipping carton when the stack was placed therein. For the reasons previously stated, it is desirable that the position of the tile on the bottom of the stack be reversed.

The problem in the past has been that since the tile are being conveyed through the adhesive-applying apparatus at a rate of about 200 feet a minute, the tile issues therefrom at the rate of about 150 to 200 tile a minute. This resulted in a time interval between the arrival of each tile of the stack which was so short that the position of the bottom tile of the stack could not be reversed without disrupting the formation of the stack. Therefore, in the past, many times, the bottom tile was reversed manually. This, obviously, constituted an inefficient method of accomplishing a desired orientation of the tile.

U.S. Pat. No. 3,128,889 relates to a machine for handling shingles or similar sheet-like pieces wherein, shingles are continuously received from the cutting end of a shingle manufacturing machine and automatically stacked in bundles of the desired number ready for packaging. The machine includes means to count and selectively invert certain of the shingles as they are formed into a stack. It is stated that the machine is capable of inverting only the first or last shingle in the stack if desired. However, in this machine the shingles issuing from the machine are deposited on a conveyor in rows. The shingles are carried by the conveyor to a receiving tray where a bundle or stack thereof is formed. A shingle flipping or inverting mechanism is mounted between the receiving tray and the conveyor and the number and sequence of the shingles to be inverted can be varied as desired by rearrangement of pins in an indexing wheel which is operably connected to the fingers of the flipping or inverting mechanism. A reciprocating pusher is provided for moving the shingles from the receiving tray onto a conveyor which places them in a box.

Obviously, the machine disclosed in U.S. Pat. No. 3,128,889 could not be used successfully to solve the tile orientation problem solved by the present invention. Since the tile being handled in the present invention, as previously stated, issue from the adhesive coating apparatus at a rate of about 150 to 200 tile a minute, it would not be feasible to deposit them on a conveyor in rows and then handle them in the manner disclosed in U.S. Pat. No. 3,128,889 because, to deposit the tile on a conveyor in rows when they are issuing from the adhesive applying apparatus at the high rate previously indicated, it would be necessary for the conveyor on which the rows are being formed to be traveling at such a high speed that the insufficient time interval previously mentioned for flipping an article would again occur at the point where the tile would be delivered from the conveyor to the receiving tray.

U.S. Pat. No. 2,921,508 relates to a stacking machine for flat pieces of rigid or semi-rigid materials such as floor tile wherein the tile are fed from two diametrically opposed hoppers, one at a time, either alternately or in predetermined sequence onto a vertical movable transporter. This patent recognizes the desirability of orienting the tile in such a manner as to have the lowermost tile in the stack face up. This is accomplished by loading the tile facedown in one hopper and faceup in the other hopper and one or more tile are fed initially from the hopper in which they are stored faceup to insure that the lowermost tile in the stack is faceup before the feed of the tile from the other hopper is started. Also, just before compilation of a stack, the feed of tile from the hopper in which they are stored faceup is stopped before the feed of the tile from the hopper in which they are stored facedown, thereby insuring that the uppermost tile in the stack is facedown.

The problem previously indicated herein of how to form a stack of tile at a high rate of speed while still having the bottom tile facing upwardly has not been solved by the prior art.

SUMMARY OF THE INVENTION

This invention relates to an apparatus for orienting tile or similar flat elements and comprises means for removing the top tile of a stack of tiles by pneumatically forcing engaging means into engagement with the back surface of the tile, and pneumatically actuated means for moving the tile and the engaging means in a lateral direction to slide the top tile off of the stack onto a tile flipper or inverting mechanism. The tile is then flipped over onto a conveyor and held in position thereon. The remaining tiles in the stack are moved by means of a roller conveyor to a location adjacent the inverted tile.

The stack of remaining tile is then moved to a position above the inverted tile and deposited thereon by means of a pusher plate actuated by first air cylinder and tile support fingers actuated by second air cylinder. The pusher plate and tile support fingers are adapted to move in unison at right angles to the movement of the first conveyor whereby the tiles are pushed off of the conveyor onto the tile support fingers. Upon retraction, the tile support fingers are retracted first and the pusher plate holds the stack of tile in position as it is deposited on top of the inverted tile. The pusher plate is then retracted. Thus, there is formed a tile stack having the tile therein so oriented that the back surfaces of the tiles on both ends of the stack face outwardly and the stack so formed may then be conveyed to a desired location for packaging.

It is an object of the invention to provide a tile-orienting apparatus capable of functioning in conjunction with a high speed tile-processing machine to orient the tile in such a manner wherein the backs of the tiles on both ends of the stack face outwardly. It is a further object of the invention to provide such an apparatus that is comparatively simple and reliable in operation.

BRIEF DESCRIPTION OF THE DRAWINGS

FIG. 1 is a plan view diagramatically illustrating the apparatus of this invention;

FIG. 2 is a side elevational view of the mechanism used to remove the top tile from the original stack of tiles and shows the air cylinders in retracted position;

FIG. 3 is a side elevational view of the mechanism of FIG. 2, showing the air cylinders in their extended positions with the top tile removed from the original stack and positioned on the tile flipper support;

DESCRIPTION OF THE PREFERRED EMBODIMENT

Figure 4:
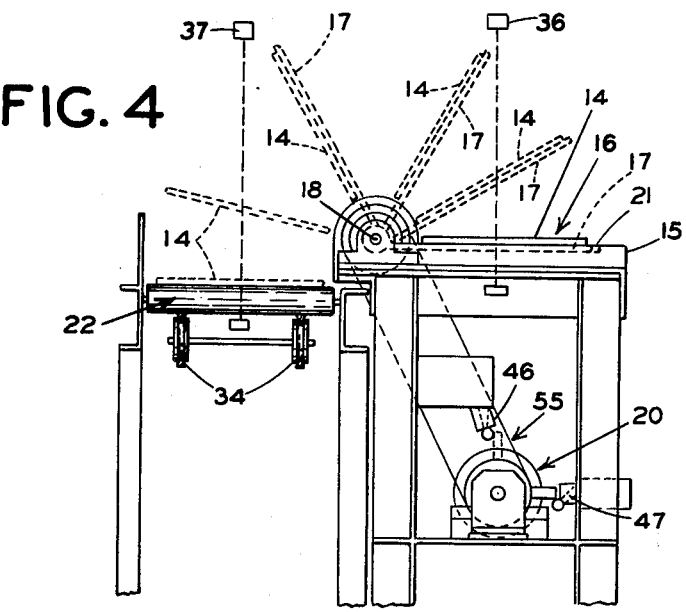
FIG. 4 is an elevational view showing the device of this invention used to flip the tile positioned on the tile flipper support onto a conveyor.

As shown in FIG. 1, there is provided a roller conveyor 1 with a stack of tiles 2 positioned thereon and held in place by a stop gate 3. A single tile shuttle apparatus 4 is positioned to extend above and partially over the stack of tiles 2 and, as best seen in FIGS. 2 and 3, the single tile shuttle apparatus 4 comprises an air cylinder 5 having mounted on the plunger 6 thereof a support member 7. An arm 8 is mounted on support member 7 and adapted to pivot around the fastening means 9 by which it is attached to the support member 7. Mounted on the other end 10 of the arm 8 and on the top end of the support member 7 is an air cylinder 11. Spring wire fingers 12 having one end secured to the fastening means 9 of arm 8 on the support member 7 extend downwardly at an angle therefrom.

As best seen in FIG. 3, when air is supplied to the air cylinder 5 and as the plunger 6 is forced outwardly, the spring wire fingers 12 engage the back surface 13 of the top tile 14 of the stack of tiles 2 forcing the top tile 14 off of the stack 2 onto the tile flipper support 15. Stop 24 is provided on the flipper support 15 to assure proper positioning of the tile 14 thereon.

Figure 5:
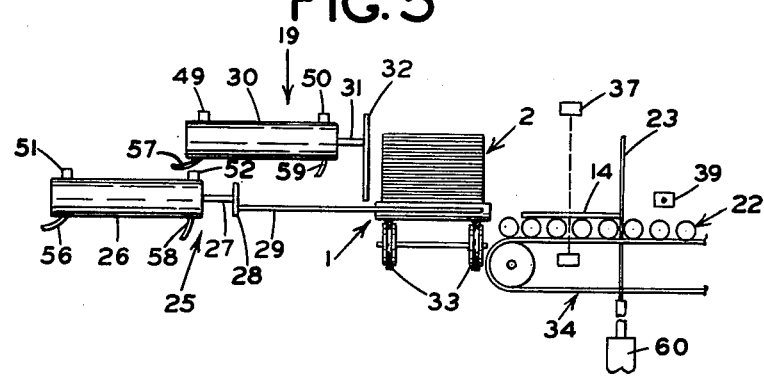
FIG. 5 is an elevational view showing the means used to move the stack of tiles remaining, after the top tile has been removed therefrom, onto the single tile after it has been flipped into position on the conveyor.

The tile flipper 16 is best seen in FIGS. 1 and 4 and comprises fingers 17 which are pivoted at 18 on flipper support member 15. The flipper fingers 17 are adapted to be moved in an arc of about 120° by means of a reversable pneumatic actuator 20 such as the Rotary Torque Helical Rod Actuator available from Carter Controls Inc. 170th Street, Lansing, MI. The flipper fingers 17 are located in slots 21 in flipper support member 15 and when actuated serve to flip the tile 14 off of the support member 15 onto the conveyor 22 where it is held in position by stop gate 23. The plunger 6 of the single tile shuttle air cylinder 5 is then retracted to the position shown in FIG. 2 and the remaining stack of tiles 2 proceeds along roller conveyor 1 until it encounters stop 24 located at the end of roller conveyor 1. As best seen in FIG. 5, the means 25 for moving the stack 2 off of conveyor 1 onto the tile 14 positioned on conveyor 22, comprises a scraper/pusher assembly 19 which includes an air cylinder 26 having a plunger 27 with a plate 28 mounted thereon. Mounted on plate 28 and extending outwardly therefrom are elongated fingers 29 which extend between the rollers of conveyor 1. Another air cylinder 30 having a plunger 31 with a pusher plate 32 mounted thereon is positioned above the air cylinder 26 and the fingers 29 extending from plate 28 mounted on plunger 27 thereof. In operation the plungers 27 and 31 of cylinders 26 and 30 extend in unison and the stack of tiles 2 is pushed out over the single piece of tile 14 on the conveyor 22 by the pusher plate 32 onto the fingers 29 and is thus suspended by the fingers 29 directly over the tile 14 on conveyor 22. Cylinder 26 then retracts the fingers 29 while the pusher plate 32 of cylinder 30 holds the tile stack 2 in position. The stack 2 is thus deposited on top of the inverted tile 14. The cylinder 30 then retracts, stop gate 23 retracts, and the stack 2 proceeds to the packaging operation.

Roller conveyors 1 and 22 are driven in a known manner by conventional friction drive means comprising belt and pulley arrangements 33 and 34.

The operation of and the sequence in which the components of the apparatus of this invention are activated are accomplished through the use of conventional limit switches and photoelectric switches. The operation is as follows:

With stop gate 3 in its raised position, the single tile shuttle apparatus 4 in its retracted position, and the tile flipper fingers 17 retracted, a stack of tile 2 (facedown) coming down the conveyor 1 breaks the beam of photoelectric switch 35. Switch 35 is operably connected in a known manner to means (not shown) for supplying air to cylinders 5 and 11 through lines 41 and 42 to cause the plunger 6 of cylinder 5 and plunger 43 of cylinder 11 to extend. The extension of these plungers causes arm 8 of the shuttle apparatus 4 to move downwardly pressing the spring wire fingers 12 into engagement with the back surface 13 of the stack of tiles 2. The forward movement of the shuttle apparatus 4 causes the top tile 14 to be slid off of the stack of tiles 2 onto the tile flipper support 15. A limit switch 44 is tripped by the shuttle apparatus 4 in its forward movement causing air to be supplied through lines 53 and 54 to cylinders 5 and 11 causing plungers 6 and 43 to retract, thus raising spring wire fingers 12 and moving the shuttle apparatus 4 rearwardly to the positions shown in FIGS. 1 and 2. The limit switches for the cylinders may be of known design and may be mounted either internally or externally of the cylinders in a known manner.

As the shuttle apparatus 4 moves rearwardly, limit switch 45 is tripped. Switch 45 is operably connected to stop gate 3 and upon being tripped causes gate 3 to retract allowing the remaining stack of tiles 2 to be moved along conveyor 1 to the stop 24.

Meanwhile the single tile 14 when deposited on the tile flipper support 15 breaks the beam of photoelectric switch 36 which is operably connected with an actuates the reversable pneumatic actuator 20 which, through the drive arrangement 55, causes the tile flipper fingers 17 to move in an arc of about 120° to flip the single tile 14 over and onto conveyor 22 as best seen in FIG. 4. The tile 14 is held in position on conveyor 22 by means of stop gate 23 as shown in FIG. 5.

As the pneumatic actuator 20 rotates the flipper fingers 17, limit switch 46 is tripped causing the actuator 20 to reverse. This brings the fingers 17 back to their at-rest position and also trips limit switch 47 shutting off the actuator 20.

Figure 6:
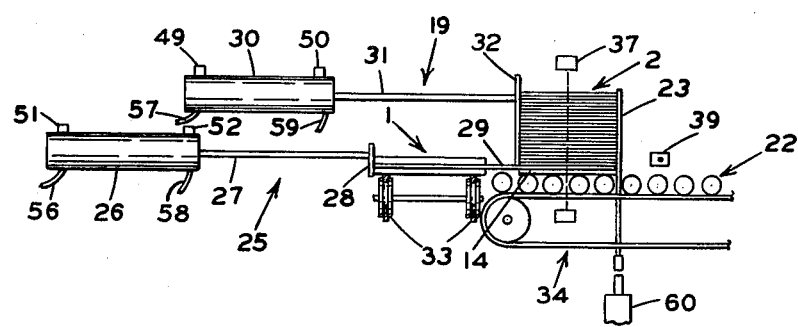
FIG. 6 is an elevational view of the device of FIG. 5, in its extended position and the remaining stack of tiles being held in position over the inverted single tile prior to their being deposited thereon.

When the remaining stack of tiles 2 is stopped by the stop 24, limit switch 48 is tripped. If the beam of photoelectric switch 37 has been broken by a tile 14 being deposited on conveyor 22, the pusher/scraper assembly 19 is activated by air supplied through lines 56 and 57 to cylinders 26 and 30. This causes the plungers 27 and 31 to extend with the result that the remaining stack of tiles 2 is pushed off of conveyor 1 by pusher plate 32 onto the elongated fingers 29 and suspended thereby in position directly above the inverted single tile 14 on conveyor 22 as best seen in FIG. 6.

As the plungers 27 and 31 extend, limit switches 50 and 52 are tripped. This causes retraction, by means of air supplied through line 58, first, of the plunger 27 of cylinder 26 and the fingers 29. Thus the stack of tiles 2, held in position by the pusher plate 32 and stop gate 23, is deposited on top of the single inverted tile 14. The plunger 31 and pusher plate 32 are then retracted by means of air supplied through line 59. Upon retraction of the pusher/scraper assembly 19, limit switches 49 and 51 are tripped. After limit switch 49 has been tripped, stop gate 23 is retracted by air cylinder 60 allowing the completed stack of tiles to proceed along conveyor 22 to a packaging operation. When the stack clears photoelectric switch 39, stop gate 23 goes back up again and the apparatus is ready for operation again.

What is claimed is:

1. An apparatus for orienting tile or similar flat elements comprising in combination:
    (a) means for removing the top tile from a stack of tiles at a first location, said means including means for engaging the back surface of the tile, means for forcing the engaging means into engagement with the back of the tile, and means for moving the top tile-removing means;
    (b) means for inverting the top tile and positioning it at a second location;
    (c) means for moving the remainder of said tiles in stacked form to a location adjacent said second location;
    (d) means for moving the remainder of said tiles in stacked form to a position above said inverted tile at said second location and depositing the stack thereon whereby there is a formed a tile stack having the tiles therein so oriented that the back surface of the tiles on both ends of the stack face outwardly; and
    (e) means for moving the tile stack so formed from said second location to a third location.

2. An apparatus according to claim 1 wherein the top tile-inverting means comprises pneumatically activated fingers, each pivoted at one end, the other end being adapted to move in an arc of about 120°.

3. An apparatus according to claim 1 including means for holding said stack of tiles for a predetermined amount of time when positioned at said first location, means for holding the stack of tiles when positioned adjacent said second location, and means for holding said inverted tile at said second location until the remainder of tiles in stacked form is deposited thereon.

4. An apparatus according to claim 1 wherein the means for moving the remainder of said tiles in stacked form to a location adjacent said second location comprises a roller conveyor, and wherein the means for moving the remainder of said tiles in stack form to a position above said inverted tile at said second location and depositing the stack thereon includes a pusher plate actuated by a first air cylinder, and tile-support fingers activated by a second air cylinder, said pusher plate and tile-support fingers being adapted to move in unison at right angles to the movement of the conveyor, whereby the tiles are pushed off of the conveyor onto the tile-support fingers and wherein upon retraction of the pusher plate and the tile-support fingers the tile stack is deposited on top of the inverted tile.

* * * * *